United States Patent Office 3,428,222
Patented Feb. 18, 1969

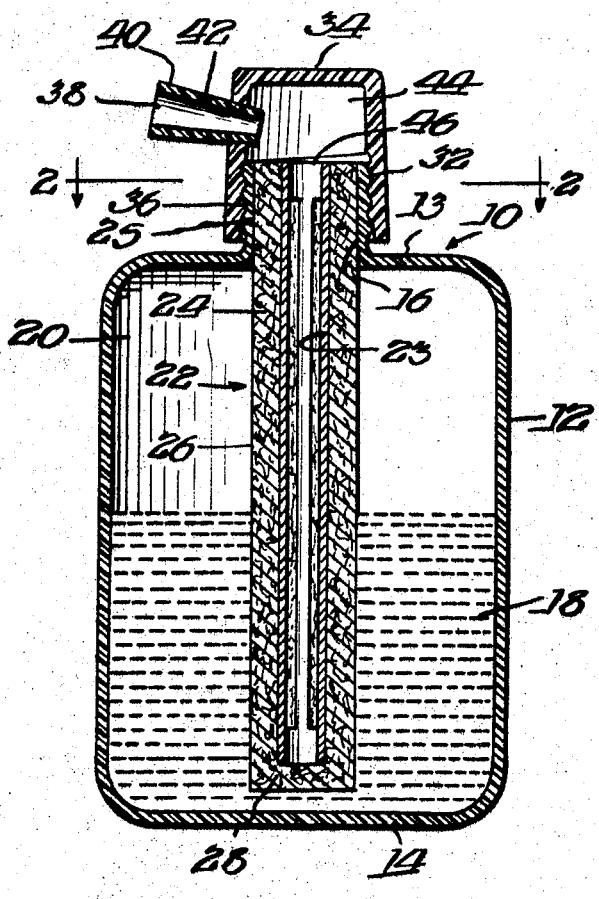

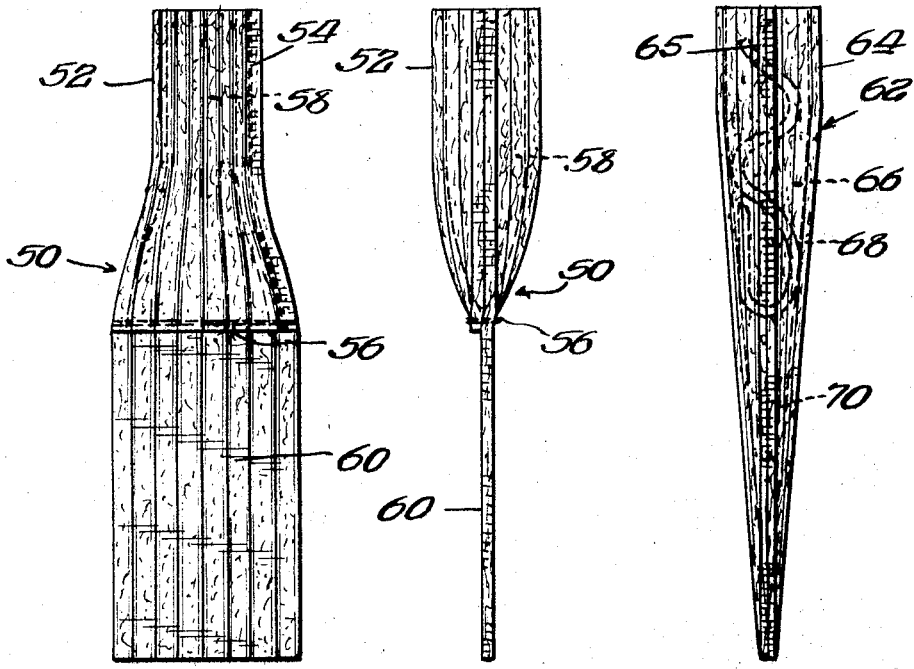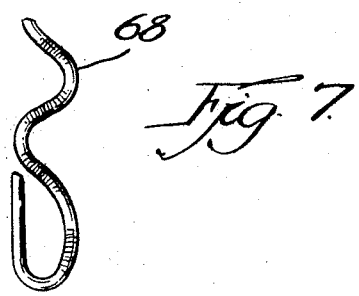

3,428,222
FOAM DISPENSING DEVICE
Hershel Earl Wright, 18 8th Drive, Decatur, Ill. 62525
Filed Nov. 7, 1966, Ser. No. 592,516
U.S. Cl. 222—187                                                10 Claims
Int. Cl. B65d 3/00; B67d 5/58

ABSTRACT OF THE DISCLOSURE

A device for producing and dispensing foam including a compressible reservoir containing foamable liquid and air and having a discharge orifice releasably secured to the upper portion thereof. A hollow foam producing element capable of wicking or capillary action with the foamable liquid is inserted into the reservoir so as to contact the air and depend into the foamable liquid with its central cavity in communication with the discharge orifice. Compression of the reservoir forces air inwardly through the wall of the element to produce foam within the element cavity from the foamable liquid within the element wall due to capillary action and effects discharge of the foam so produced from the discharge orifice.

---

This invention relates generally to a dispensing device, and more particularly to a device for effecting the formation of a foam from a foamable liquid and dispensing the foam for use as desired.

Applicator and dispensing devices utilizing liquid reservoirs having compressible bodies to facilitate the discharge of liquids therefrom through a sponge or wick member are generally old. For example, such devices are commonly known for cleaning purposes, applying glue, and for applying lathers to the skin. In general, these prior art devices, and in particular the lather applicators, require shaking or agitation of the liquid reservoir to form a lather prior to applying the same, and further require that the foam be wiped from the applicator. More recent advances in the art have provided pressurized containers which effect foaming of the foamable material and force the foam from the reservoir. These recent dispensing devices have the disadvantage that the gas used in effecting the foaming and discharge action does not replenish itself, thus limiting the dispensing device to a relatively short life.

It is the primary object of the present invention to eliminate the disadvantages heretofore encountered in the prior art devices by providing a foam dispensing device wherein air within the liquid reservoir is utilized to effect a foaming action and which device provides for the air supply to be continually replenished through usage of the dispensing device.

Another object of the present invention is to provide a foam dispensing device which eliminates the need for shaking or agitating the reservoir containing the foamable liquid to effect a foaming action prior to discharging the foam from the dispensing device.

Another object of the present invention is to provide a foam dispensing device utilizing a novel foam producing element which is wetted by the foamable liquid and includes a center cavity in which foam is produced as air is forced through the wall portion of the element defining the cavity.

A further object of the present invention is to provide a foam dispensing device wherein a simple compression of the deformable liquid reservoir effects the formation of a foam and discharges the foam from the dispenser thereby eliminating the need for wiping the foam from a discharge surface on the dispensing device.

Another object of the present invention is to provide a foam dispensing device which is economical to manufacture and extremely simple in operation, and which may be used for an indefinite period of time due to its air replenishing feature.

Further objects and advantages of my invention, together with the organization and manner of operation thereof, may best be understood by reference to the following description taken in connection with the accompanying drawings, wherein like reference numerals identify like elements and in which:

FIGURE 1 is a median vertical sectional view through a foam dispensing device constructed in accordance with the present invention;

FIGURE 2 is a horizontal sectional view taken substantially along the line 2—2 of FIGURE 1;

FIGURE 3 illustrates a reinforcing member which may be used in the dispensing device of FIGURE 1;

FIGURE 4 is an elevational view illustrating an alternative embodiment of a foamable liquid wicking and foam producing element;

FIGURE 5 is a side elevational view of the embodiment illustrated in FIGURE 4;

FIGURE 6 is an elevational view of another embodiment of a foamable liquid wicking and foam producing element; and FIGURE 7 is a detail elevational view of the internal support member utilized in FIGURE 6.

Referring now to the drawings, there is shown in FIGURE 1 a dispensing device, shown generally by reference numeral 10, in accordance with the present invention. The dispensing device 10 includes a liquid reservoir or container body 12 preferably composed of a relatively deformable and compressible material, such as polyethylene. The reservoir 12 has a generally cylindrical shape having a closed bottom end surface 14 and an upper aperture 16. It is desirable that the cylindrical wall portion of the reservoir body 12 be made of such a thickness as to allow for repeated squeezing or compression of the reservoir while not being so thick as to require a greater force to compress it than can ordinarily be obtained between the user's fingers, as will become more apparent hereinbelow.

The reservoir or container body 12 is adapted to receive and contain a quantity of a foamable liquid 18, such as liquid shampoo, liquid soap, or any of the other known foaming liquids. The reservoir body also receives a quantity of air 20, the volume of which will vary according to the amount of foamable liquid 18 contained within the reservoir. As will become apparent hereinbelow, it is desirable that at least a small volume of air be present within the reservoir body at all times.

Disposed within the reservoir body 12 in a position so as to depend downwardly through the aperture 16 is an elongated wicking and foam producing element, shown generally by reference numeral 22. In the embodiment illustrated in FIGURE 1, the element or member 22 has a generally cylindrical hollow configuration having a central cavity or passage 23 therein defined by an annular wall portion 24. The annular wall 24 may be formed as an integral tubular member or may be formed from a sheet-like member having its side edge portions suitably secured to form the annular wall. An upper outer peripheral surface portion 25 of the hollow member 22 has a configuration substantially identical to that of aperture 16 so that the hollow member 22 is snugly received within aperture 16 and positively retained in position within the reservoir. The lower end 28 of hollow member 22 is closed such that the central passage 23 is not in open communication with the interior of the reservoir body 12 through the lower end. The hollow member 22 has a length such that it will extend substantially to the bottom end surface 14 of the reservoir and thus to substantially the full depth of the foamable liquid 18 contained within the reservoir body.

The cylindrical hollow member 22 is made of a porous material having the property of exhibiting a wicking action when in contact with the foamable liquid. Member 22 can thus maintain itself thoroughly wetted with the foamable liquid 18 within the reservoir body 12 through capillary action of the foamable liquid upwardly through the annular wall portion 24. It has been found that a sponge cloth material made from cellulose is particularly suitable for this purpose. Materials under the trade names of Nylonge sponge cloth and Amsco sponge cloth have proven to give the best results for the desired purpose.

It has been found that an annular wall thickness of 4–8 millimeters for the hollow member 22 provides the desirable foaming action through the mechanism as described below. The optimum wall thickness selected for member 22 will be determined to some extent by the consistency of the foamable liquid. The heavier, more viscous foamable liquids have been found to give the desired foaming action when used with a foam forming element having a relatively thin wall thickness, while the less viscous foamable liquids may best be used in combination with elements having a greater wall thickness.

An upper vertically extending annular portion 32 of the reservoir body 12 defines the aperture 16 and is provided with a threaded portion on the outer peripheral surface thereof to receive a cap means 34 thereover. The cap means 34 is provided with a mating internal threaded portion 36 so as to form a means for releasably securing the cap 34 to the reservoir housing 12. The cap means 34 is further provided with a discharge orifice 38 defined by a generally truncated conical member 40 which is suitably secured in an aperture 42 in the cap 34. The cross sectional area of the discharge orifice 38 may vary and will primarily be determined by the density of foam desired. For example, a small cross sectional area discharge orifice will tend to squeeze the foam as it is discharged, thereby making it richer in texture. On the other hand, a larger orifice will allow the foam being discharged to expand and become frothier. The discharge orifice 38 is in direct communication with the upper end of the central passage 23 of the foam producing element 22 through a cavity 44 defined by the cap means 34. While the discharge orifice 38 is illustrated as being defined by the truncated conical shaped member 40, it will be understood that member 40 is not critical to the proper discharge of foam as will be hereinafter described, but rather provides a convenient discharge nozzle which is readily accessible to the user's hand and assists in eliminating unnecessary spillage.

It may be desirable to provide an air return valve (not shown) in the upper portion 13 of the reservoir body 12 to assist in replenishing air to the inside of the reservoir as at 20. The air valve may be of the conventional type which would allow air to be introduced into the reservoir 12 during the return of the reservoir body to its normal shape after compressing or squeezing it, but which would prevent the passage of air through the valve upon compression of the reservoir body.

The foam producing element 22 is preferably provided with a generally cylindrically shaped hollow reinforcing member 46 (FIGURE 3) which is received within the central passage 23 of element 22 and serves to prevent collapse or inward deformation of the annular wall portion 24 during operation of the dispensing device. The reinforcing member 46 has an outer diameter substantially equal to the diameter of passage 23 and includes a plurality of longitudinally extending openings 48 therein which extend substantially the length of the reinforcing member. The openings 48 allow foam to be readily formed and received within the central passage 23 of element 22 as will become apparent hereinbelow. While the reinforcing member 46 is described and illustrated as being a cylindrical cage-like member, it will be understood that any other suitable means such as a cylindrically shaped coil spring will also provide suitable reinforcement to retain the shape of the porous cylindrical member 22.

In operation, a suitable quantity of foamable liquid such as a shampoo, a shaving liquid, or a liquid soap is poured into the reservoir body 12 through the aperture 16 prior to insertion of a wicking and foaming producing element such as the porous hollow element 22. As noted hereinabove, it is desirable that the reservoir body 12 not be completely filled with the foamable liquid 18, so that a volume of air 20 will be established above the foamable liquid 18 within the reservoir. After partially filling the reservoir 12 with the foamable liquid 18, the foam producing element 22 is inserted through aperture 16 until the upper end thereof is substantially level with the upper end of reservoir body portion 32. The peripheral surface portion 26 of hollow member 22 will then be in contact with both the foamable liquid 18 and the air 20 contained within the reservoir 12. The cap means 34 having the discharge orifice 38 is thereupon threadedly secured to the reservoir body portion 32.

When it is desired to obtain foam from the dispensing device, the cylindrical wall 12 of the reservoir body is compressed inwardly by squeezing it between the user's fingers to thereby force a portion of the air 20 through that portion of the porous annular wall 24 of the cylindrical member 22 which is in contact with the air. As the air is passed through the annular wall 24, it will cause the foamable liquid 18 present in the porous wall 24 by virtue of the above noted wicking or capillary action to foam within the central passage 23. Continual compression of the reservoir body will force the foam thus produced to rise upwardly and be passed through cavity 44 and out the discharge orifice 38. Upon release of the compression forces from the reservoir body 12, the reservoir will return to its original non-compressed position. Simultaneously with the return of the reservoir body 12 to its relaxed position, air will be drawn inwardly through discharge orifice 38 in a reverse path through the porous annular wall 24 defining central passage 23 and into the reservoir 12. This inward flow of air into passage 23 and through wall 24 will cause any foam particles which may have formed within the body of wall 24 to be passed from the element 22, thus allowing a further wetting of the wall 24 with foamable liquid preparatory to further foam formation within passage 23 upon subsequent squeezing of reservoir 12.

Referring now to FIGURES 4 and 5, an alternative embodiment of a foamable liquid wicking and foam producing element is indicated generally by reference numeral 50. The foam producing element 50 comprises a generally cylindrical upper portion 52 having an outer peripheral configuration substantially equal to that of aperture 16. Upon inserting the element 50 into the reservoir 12 of FIGURE 1, the upper portion 52 will engage the internal peripheral surface of aperture 16 to fixedly position element 50 within the reservoir. The element 50 is formed of a porous material having the same properties as the material used for the element 22 illustrated in FIGURE 1. The upper portion 52 of element 50 is formed by folding a sheet-like portion of the porous material back upon itself and securing the mating edge portions together in a suitable manner, such as by sewing at 54 and 56 in a conventional manner. The upper portion of element 50 thus forms a cavity 58 while the lower portion 60 comprises a single layer of the foamable material.

It can be seen that the element 50 differs from the above described element 22 in that only the upper portion thereof defines the foam forming cavity 58. In inserting the element 50 into reservoir 12, the lower portion 60 thereof, being made of a pliable porous wicking material, may be readily manipulated for ready insertion into the reservoir body 12. Upon insertion of the element 50 into the reservoir 12, the lower portion 60 thereof would depend into the foamable liquid contained within reservoir 12 and provide a wicking action allowing the foamable liquid to move upwardly throughout the wall portion defining cavity 58.

The operation of the present foam dispensing device when utilizing a foam producing element 50, will be substantially the same as that above described with reference to FIGURE 1. The use of an element such as 50 may be desirable where a relatively nonviscous foamable fluid is being used in the dispensing device. By restricting the foam producing cavity to the upper portion of the foam producing element, such as cavity 58, the possibility of the foamable liquid passing into the central cavity and being discharged in a liquid state through orifice 38 is eliminated. It will be understood that a conventional reinforcing element may be inserted within the cavity 56 to preclude the possibility of collapse of the upper wall portion 52 of the element 50 when the cylindrical wall portion of reservoir 12 is squeezed to produce foam.

FIGURE 6 illustrates a further alternative embodiment of a foamable liquid wicking and foam producing element and shows a generally conically shaped element 62. The element 62 has an open upper end portion 64 having an outer peripheral configuration similar to that of aperture 16 for suitably securing the element 62 within the reservoir 12. The element 62 may be formed by folding a sheet of the porous wicking material as was utilized for element 22 of FIGURE 1, into the desired conical shape. The mating edge portions may then be suitably secured together as at 65 by sewing in a conventional manner.

A spiral reinforcing member 68 is preferably provided within the cavity 66 formed within element 62 to prevent collapse of the thin wall of porous material comprising element 62. If desired, the lower portion 70 of element 62 may be filled with a porous wetting material similar to that used to form the element 62, thereby preventing the foamable liquid from entering the lower portion of element 62 while insuring the desired wicking action of the foamable liquid into the upper wall portion 64 defining cavity 66. The use of a generally conically shaped foam producing element, such as 62, will decrease the time required to assemble the foam dispensing device as the lower conical portion of element 62 will lend itself to ready insertion through aperture 16 into the reservoir 12.

It can thus be seen that the foam dispensing device according to the present invention automatically replenishes the air within the reservoir body 12 preparatory to forming additional foam which will again be discharged through discharge orifice 38. The dispensing device therefore assures continued use until the foamable liquid is depleted. It will further be seen that when the foamable liquid of the illustrated foam dispensing device has been depleted, the cap means 34 and the porous hollow member 22 may be removed from the reservoir body to allow additional foamable liquid to be poured into the reservoir body for continued use of the dispensing device.

While preferred embodiments of my invention have been shown and described, it will be obvious to those skilled in the art that changes and modifications may be made therein without departing from the invention in its broader aspects, and therefore, the appended claims are intended to cover all such changes and modifications as fall within the true spirit and scope of my invention.

I claim:

1. A foam dispensing device for use with foamable liquids and the like, comprising a reservoir adapted to contain a quantity of foamable liquid and air, said reservoir having an aperture therein and including a generally longitudinally extending deformable wall portion, an elongated foam producing element extending downwardly within the deformable wall portion of said reservoir in contacting relation with the foamable liquid and air therein, said element having a porous wall portion spaced sufficiently inwardly from said deformable wall portion of said reservoir so that the longitudinal length of said deformable wall portion of said reservoir is compressible inwardly a substantial distance without compressing said foam producing element, said wall portion of said element defining a cavity within said element in communicating relation with said aperture and being made of a material capable of continually maintaining itself thoroughly wetted with the foamable liquid within said reservoir, and cap means including a discharge orifice communicating with said aperture and said cavity, said deformable wall portion of said reservoir being compressible in an amount sufficient to pass air contained within said reservoir through said porous element wall portion to form a foam within said cavity from the foamable liquid within said element wall without compressing said foam producing element and effect discharge of the foam through said discharge orifice.

2. A foam dispensing device for use with foamable liquids and the like, comprising a reservoir adapted to contain a quantity of foamable liquid and air, said reservoir having an aperture therein and including a generally longitudinally extending deformable wall portion, an elongated generally cylindrical hollow foam producing element defined by a porous annular wall, said foam producing element having a closed lower end and being supported by and within said reservoir in contacting relation with the foamable liquid and air therein, said annular wall of said element being spaced sufficiently inwardly from said deformable wall portion of said reservoir so that the longitudinal length of said deformable wall portion of said reservoir is compressible inwardly a substantial distance without compressing said foam producing element, said annular wall of said element defining a cavity within said element in communicating relation with said aperture and being made of a material capable of continually maintaining itself thoroughly wetted with the foamable liquid within said reservoir, and cap means including a discharge orifice communicating with said aperture and said cavity, said deformable wall portion of said reservoir being compressible in an amount sufficient to pass air contained within said reservoir through said element annular wall to form a foam within said cavity from the foamable liquid within said element wall without compressing said foam producing element and effect discharge of the foam through said discharge orifice.

3. A foam dispensing device as defined in claim 2 wherein said cylindrical hollow foam producing element includes a lower portion comprising a planar longitudinal extension of a portion of said element wall, said element having an upper portion defining said cavity in which foam is produced by compressing said deformable wall portion of said reservoir to force air contained within said reservoir through said porous annular wall defining said cavity.

4. A foam dispensing device for use with foamable liquids and the like, comprising a reservoir adapted to contain a quantity of foamable liquid and air, said reservoir having an aperture therein and including a generally longitudinally extending deformable wall portion, an elongated generally conically shaped foam producing element having a closed lower end, said element being supported by and disposed within said reservoir in contacting relation with the foamable liquid and air therein, said element having a generally conically shaped porous wall portion spaced sufficiently inwardly from said deformable wall portion of said reservoir so that the longitudinal length of said deformable wall portion of said reservoir is compressible inwardly a substantial distance without compressing said foam producing element, said wall portion of said element defining a cavity within said element in communicating relation with said aperture and being made of a material capable of continually maintaining itself thoroughly wetted with the foamable liquid within said reservoir, and cap means including a discharge orifice communicating with said aperture and said cavity, said deformable wall portion of said reservoir being compressible in an amount sufficient to pass air contained within said reservoir through said porous element wall portion to form a foam within said cavity from the foamable liquid within said element wall without compressing said foam producing element and effect discharge of the foam through said discharge orifice.

5. A foam dispensing device as defined in claim 1 wherein said discharge orifice is adapted to allow air to be introduced into said element reservoir by reverse flow through said wall portion when said reservoir is returned to a noncompressed position.

6. A foam dispensing device as defined in claim 1 wherein said foam producing element is partially disposed within said aperture and has a peripheral portion thereon snugly engaging the peripheral surface of said aperture.

7. A foam dispensing device as defined in claim 1 including a reinforcing means within said cavity to prevent inward deformation of said element wall portion upon compression of said reservoir.

8. A foam dispensing device as defined in claim 2 including a reinforcing means within said cylindrical hollow element to prevent inward deformation of said annular wall upon compression of said reservoir.

9. A foam dispensing device as defined in claim 8 wherein said reinforcing means comprises a generally cylindrical member having longitudinally extending openings therein to allow substantially unrestricted flow of air through said annular wall.

10. A foam dispensing device as defined in claim 1 wherein said cap means is releasably secured to said reservoir adjacent said aperture to allow said foam producing element to be readily removed from said reservoir when introducing a foamable liquid into said reservoir.

References Cited
UNITED STATES PATENTS

| | | | |
|---|---|---|---|
| 2,980,342 | 4/1961 | Armour | 222—211 X |
| 3,010,613 | 11/1961 | Stossel | 222—207 X |
| 3,132,807 | 5/1964 | Nadai | 222—211 X |
| 3,308,993 | 3/1967 | Bruno | 222—189 X |

STANLEY H. TOLLBERG, *Primary Examiner.*

U.S. Cl. X.R.
222—190